United States Patent [19]
Post

[11] Patent Number: 5,356,098
[45] Date of Patent: Oct. 18, 1994

[54] COMMUNICATION SYSTEM FOR TRANSMITTING RF SIGNALS REPRESENTATIVE OF DEFECTS OR HAZARDS IN A RAILWAY SYSTEM HAVING FRANGIBLE GLASS ACTIVATION

[75] Inventor: Kendall E. Post, Madison, Wis.

[73] Assignee: General Railway Signal Corporation, Rochester, N.Y.

[21] Appl. No.: 93,191

[22] Filed: Jul. 15, 1993

[51] Int. Cl.⁵ .................................................. B61L 3/00
[52] U.S. Cl. ............................. 246/169 A; 429/116; 340/682
[58] Field of Search .............. 246/169 A; 429/112, 429/116; 340/682

[56] References Cited

U.S. PATENT DOCUMENTS

| | | | |
|---|---|---|---|
| 4,009,055 | 2/1977 | Fujiwara | 429/116 X |
| 4,501,006 | 2/1985 | Korenberg | 246/169 A X |
| 4,762,757 | 8/1988 | Eppley et al. | 429/116 X |
| 4,800,141 | 1/1989 | Eppley et al. | 429/116 |
| 4,812,826 | 3/1989 | Kaufman et al. | 246/169 A X |
| 5,203,278 | 4/1993 | Kinney | 246/169 A X |

*Primary Examiner*—Robert J. Oberleitner
*Assistant Examiner*—S. Joseph Morano
*Attorney, Agent, or Firm*—John F. Ohlandt

[57] ABSTRACT

A communication system for submitting RF signals responsive to the currents of defects or hazards in a railway system wherein a reserve cell ampule containing an electrolyte is disposed in one compartment of a housing and the electronic apparatus transmitting desired signals is disposed in a second compartment such that when the reserve cell is heated the pressure rises within the ampule to rupture it, whereby the electrolyte contained is dispersed in the first compartment and causes energization of electronic apparatus including an antenna connected to such apparatus, whereby the antenna is ejected from the housing and is able to broadcast suitable RF signals.

5 Claims, 1 Drawing Sheet

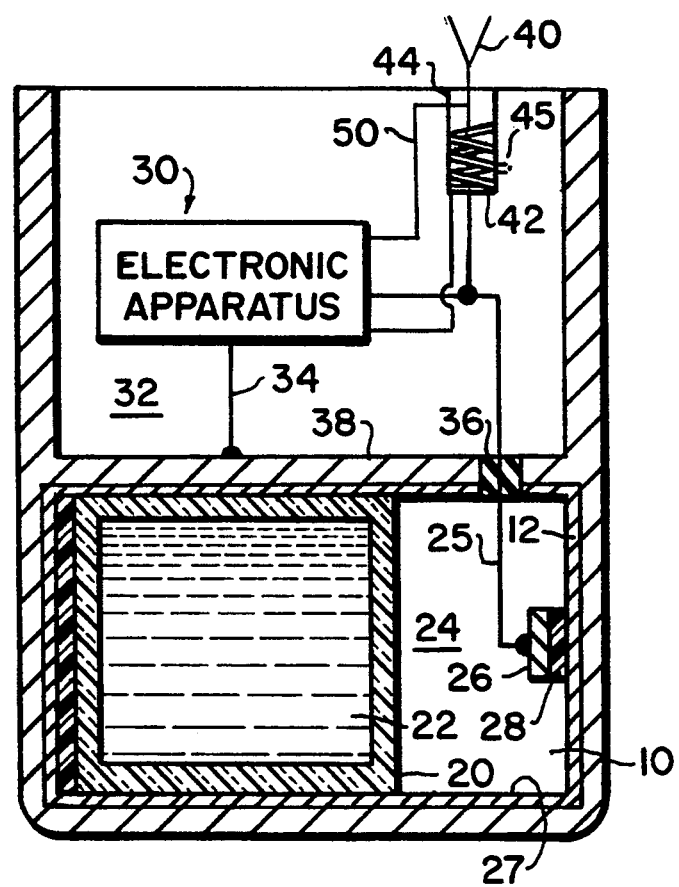

COMMUNICATION SYSTEM FOR TRANSMITTING RF SIGNALS REPRESENTATIVE OF DEFECTS OR HAZARDS IN A RAILWAY SYSTEM HAVING FRANGIBLE GLASS ACTIVATION

BACKGROUND OF THE INVENTION

The present invention relates to apparatus or systems for transmitting modulated RF signals to a monitoring station, especially signals serving to indicate the presence of a defect or hazard in the system. More particularly, the apparatus of the present invention is contemplated for installation in a railway system for reporting "hot bearing" or other defects to a locomotive cab or to a wayside station.

One particular environment in which the present invention may be considered for use is that disclosed in U.S. Pat. No. 4812826. In that patent, there is shown an electronic module in FIG. 3 that may be utilized in the detection of hot/bearings. When the interior of the bolt reaches a prescribed temperature due to heat being developed in the wheel bearing, the expansive effect on a wax motor causes the module to be energized and an antenna to be suitably deployed so as to transmit a modulated signal, preferably in identifiable coded form, as a warning signal that a beating may be defective.

In the particular context of U.S. Pat. No. 4812826, reliance is placed on the wax motor's response to the elevated temperature, such that the wax expands and the antenna becomes deployed for broadcast purposes. However, phase change in the wax motor is not an instantaneous event since there is a slope in its pressure/temperature curve. Accordingly, without preventive steps, it is possible for the wax motor to build enough pressure to close the switch which activates the electronic circuitry, but not so much that the antenna is fully deployed. Such an equilibrium could theoretically exist indefinitely. This potential problem would dictate the provision of a lockout mechanism and thus would add hardware complexity.

Accordingly, it is a principal object of the present invention to circumvent the aforenoted potential problem by providing a quite different approach to the issues of activation of the electronic circuitry and deployment of the system's antenna.

Lithium batteries of the reserve cell type retain the electrolyte chemistries in a glass ampule. This eliminates shelf-life degradation problems that affect "active" lithium batteries. Thus, reserve cells offer a substantial extended life expectancy advantage because they can remain in the idle state, and hence, do not suffer the self-discharge/degradation of active cells which tends to increase greatly with temperatures. Since growing numbers of commercial applications are steadily driving the volumes of reserves produced to much higher levels, their cost has been decreasing.

A reserve electro-chemical cell that is activated by high acceleration forces acting on a frangible ampule is disclosed in U.S. Pat. No. 4800141. However, such disclosure in no way refers to the objects to be obtained by the present invention as aforenoted.

SUMMARY OF INVENTION

Broadly considered, the present invention envisions the deployment of a reserve cell containing lithium as the means for responding to emergency induced, high temperature conditions, such that the cell becomes activated, thereby energizing an electronic module, whereby a signal representative of a fault or defect is generated and transmitted to a monitoring station.

The present invention recognizes that if the reserve cell can be made to respond to a temperature corresponding to a hot bearing or similar defect, the previously described communication system may be energized.

What the invention also specifically recognizes is that by controlling the quantity of gas in the ampule, a suitable activation temperature may more readily be selected, i.e., a temperature at which sufficient pressure to break the ampule is attained. Consequently, when a defect such as a hot bearing occurs, the communication system for reporting such event will become activated.

In accordance with tests that have been conducted, it has been found that the activation temperature of a conventional wax motor in such context can be duplicated and that a plus or minus 10° C. activation range may be quite feasible in certain applications.

It will be understood that the afore-described approach to activation of a communication system does not address the problem of antenna deployment directly. However, conventional means can be invoked to cause, for example, a spring loaded antenna to be released from its container upon activation of the reserve cell contents. Alternatively, explosive squid technology, which has become highly refined, can be used in place of a spring to eject the antenna; again, it is the activation of the reserve cell that produces the necessary power to cause the explosion of the suitably ensconced squid.

Briefly described, the communication system of the present invention comprises a reserve cell glass ampule containing an electrolyte, said ampule also containing an inert gas in sufficient quantity such that an activation temperature for the reserve cell greater than approximately 120°C. (+ or −10°) can be established; a housing for containing the glass ampule, electronic apparatus, including an antenna, located within said housing; said reserve cell further including electrodes electrically connected to said electronic apparatus such that when said reserve cell is activated by reaching its activation temperature, said ampule is fractured and its contents dispersed, whereby said electronic apparatus is energized and said antenna is deployed.

Other and further objects, advantages and features of the present invention will be understood by reference to the following specification in conjunction with the annexed drawings, wherein like parts have been given like numbers.

BRIEF DESCRIPTION OF DRAWING

The figure is a cross sectional-schematic illustration of an embodiment of the transmission or communication system of the present invention featuring a reserve cell in its normal or inactive state and an antenna shown in its deployed state.

DESCRIPTION OF THE PREFERRED EMBODIMENT

Referring now to the figure of the drawing, there is shown a reserve cell 10, surrounded by a housing 12, in an inactive or storage state including an electrolyte storage ampule 20 containing an electrolyte 22. The ampule 20 may be made of suitable material, for example, glass; the wall of the ampule having a thickness effective to produce a frangible layer, i.e., one capable of rupturing or collapsing when a suitable activation temperature is reached. Accordingly, the system is capable of responding to a hot bearing or similar high temperature defect occurring in proximity to the reserve cell. The ampule 22 has been designed such that an activation temperature above approximately 120° C. will cause the pressure within the ampule to rise and cause rupture of the ampule, thereby activating the cell when the electrolyte is released so as substantially to fill the compartment 24 of the cell.

The setting of the activation temperature can be achieved by including the suitable inert gas within the ampule 20, since lithium in the liquid state will not normally develop sufficient pressure for rupture of the glass ampule.

A first electrode 26 of the reserve cell or battery is affixed or mounted on an insulating member 28 which is attached to an inner surface of the compartment 24 within housing 12; member 28 provides electrical isolation of the first electrode from the compartment 24; the walls thereof being constituted of a suitable metal, thereby being conductive and constituting a second electrode 27 of the reserve cell, which, preferably, includes a metal plating formed, for example, of lithium on the inner walls of the compartment 24.

An electronic apparatus 30 is located within a second compartment 32 above the reserve cell location. The electronic apparatus receives electrical power from the reserve cell source by way of a connection 25 to electrode 26, which in the activated state of the cell is contacted by the electrolyte 22 released from the ampule. The return for the source is by way of the second electrode 27, which is coupled or connected to the ground connection 34 from the electronic apparatus 30. It will be noted that an insulation block 36 is disposed in a gap formed through the stainless steel wall 38 defining the separate compartments 24 and 32 of housing 12.

It will be understood that when the reserve cell 10 becomes activated, the power supplied from the reserve cell serves also for the purpose of deploying an antenna 40. This is accomplished by reason of the fact that antenna 40 is connected to a spring 42 and is normally held within a container 44, except that when power is supplied, a restraining member 45, normally serving to restrain spring 42 when inside container 42, is automatically removed therefrom, whereby the antenna 40 is ejected. Consequently, signals sent from the r.f. output of electronic apparatus 30 by connection 50 to antenna 40 can be efficiently broadcast to a locomotive cab or wayside Station. Of course, this is one example of antenna deployment, involving a more or less conventional antenna 40. A monopole antenna in the form of a "whip" can be substituted, which antenna can be simply coiled into the container 44 and can be ejected without the provision of a spring when the restraining member 45 is removed. Other means for accomplishing the objective of antenna deployment will occur to those skilled in the art.

Although a single embodiment is illustrated in the drawing for the purpose of presenting the fundamental principle of the invention, it will be understood that a number of other embodiments are possible. For example, lithium through chloride reserve cells have been proposed in which the construction of the cell has a battery-like cylindrical configuration. One example is a glass electrolyte ampule contained within a case and surrounded by multiple layers of cathode, anode and separator material. Such a reserve cell as described can be utilized in the present invention so as to avoid the need for separate compartments (as seen in the housing 12 of the figure), since the cell case itself provides a top seal for the electrolyte contents.

It will be appreciated that the entire structure of the communications system embodiment seen in FIG. 1, or alternately, a similar system with reserve cell configuration can be designed for fitting within a hollowed out wheel bearing bolt as seen in the aforenoted U.S. Pat. No. 4,812,826, whose details are incorporated herein by reference.

While there has been shown and described what is considered at present to be the preferred embodiment of the present invention, it will be appreciated by those skilled in the an that modifications of such embodiment may be made. It is, therefore, desired that the invention not be limited to this embodiment, and it is intended to cover in the appended claims all such modifications as fall within the true spirit and scope of the invention.

I claim:

1. A communication system for transmitting RF signals representative of defects or hazards in a railway system comprising:

a reserve cell glass ampule containing an electrolyte, said ampule containing a sufficient quantity of inert gas such that a suitable elevated activation temperature for the reserve cell can be established; a housing for containing said glass ampule;

electronic apparatus, including an antenna, located within said housing; said reserve cell further including electrodes electrically connected to said electronic apparatus such that when said reserve cell is activated by reaching its activation temperature, said ampule becomes fractured and its contents dispersed, whereby said electronic apparatus and said antenna are energized;

further in which said antenna has a connection to said electronic apparatus for broadcasting RF signals to a locomotive or to a way station; and means for deploying said antenna responsive to said reserve cell being activated.

2. A communication system as defined in claim 1, in which said housing has first and second compartments, said glass ampule being in said first compartment and said electronic apparatus in said second compartment.

3. A communication system as defined in claim 2, further including a metal wall defining said first and second compartments; an insulating member disposed in a gap formed through the metal wall, and a connection from the electronic apparatus to first and second electrodes of the cell.

4. A system as defined in claim 1, in which said means for deploying includes a spring held by a restraining member, said spring being attached to said antenna such that when power is supplied the restraining member is released and said antenna is ejected.

5. A system as defined in claim 1, in which said elevated activation temperature is approximately 120° C.

* * * * *